United States Patent
James

(10) Patent No.: US 10,167,894 B2
(45) Date of Patent: Jan. 1, 2019

(54) BALL AND SOCKET

(71) Applicant: DOWCO, Inc., Manitowoc, WI (US)

(72) Inventor: Tim James, Manitowoc, WI (US)

(73) Assignee: Dowco, Inc., Manitowoc, WI (US)

( * ) Notice: Subject to any disclaimer, the term of this patent is extended or adjusted under 35 U.S.C. 154(b) by 110 days.

(21) Appl. No.: 14/833,598

(22) Filed: Aug. 24, 2015

(65) Prior Publication Data

US 2017/0058945 A1    Mar. 2, 2017

(51) Int. Cl.
| | |
|---|---|
| *F16C 11/10* | (2006.01) |
| *B63B 17/02* | (2006.01) |
| *F16C 11/06* | (2006.01) |
| *F16C 11/04* | (2006.01) |

(52) U.S. Cl.
CPC ............ *F16C 11/106* (2013.01); *B63B 17/02* (2013.01); *F16C 11/045* (2013.01); *F16C 11/069* (2013.01); *F16C 11/0614* (2013.01); *Y10T 403/32565* (2015.01)

(58) Field of Classification Search
CPC ..... Y10T 403/32639; Y10T 403/32737; Y10T 403/32196; Y10T 403/32204; Y10T 403/32311; Y10T 403/32565; F16C 11/0609; F16C 11/0623; F16C 11/0628; F16C 11/069; F16C 11/0695; F16C 11/106
USPC ....................... 403/76, 77, 90, 114, 123, 135
See application file for complete search history.

(56) References Cited

U.S. PATENT DOCUMENTS

| | | | | |
|---|---|---|---|---|
| 1,972,246 A | * | 9/1934 | Sauer ....................... | B60R 1/06 248/481 |
| 2,210,147 A | * | 8/1940 | Griffith ..................... | B60R 1/10 248/205.1 |
| 2,817,345 A | * | 12/1957 | Woodruff, Sr. ......... | B63B 17/02 114/361 |
| 3,525,448 A | * | 8/1970 | Bauer ..................... | E02F 9/006 403/128 |
| 4,139,245 A | * | 2/1979 | McCloskey ......... | F16C 11/0614 280/506 |
| 4,660,791 A | * | 4/1987 | Lisak .................... | F16C 11/106 211/26 |
| 4,804,220 A | * | 2/1989 | Rosheim .................. | B25J 9/104 294/111 |
| 5,058,829 A | * | 10/1991 | Bentley .............. | B64D 11/0696 244/118.6 |

(Continued)

FOREIGN PATENT DOCUMENTS

DE    202005009471    10/2005

OTHER PUBLICATIONS

"Delrin® Acetal Resin." DuPont, https://web.archive.org/web/*/http://www.dupont.com/products-and-services/ plastics-polymers-resins/thermoplastics/brands/delrin-acetal-resin.html. Accessed: Sep. 11, 2018. (Year: 2013).*

*Primary Examiner* — Matthieu F Setliff
*Assistant Examiner* — Cory B Siegert
(74) *Attorney, Agent, or Firm* — Shane Delsman; Godfrey & Kahn, S.C.

(57) ABSTRACT

A joint between two structures to allow the structures to be rotatably, connected at a variety of angles while increasing the pull-out resistance and decreasing rattling. The joint has a first portion connected to a structure and a second portion connected to a structure. The first and second portions are also connected to one another via a ball and socket connection and a pin.

19 Claims, 18 Drawing Sheets

(56) References Cited

U.S. PATENT DOCUMENTS

| | | |
|---|---|---|
| 5,577,415 A | 11/1996 | Reasoner |
| 5,766,081 A | 6/1998 | Desmarais |
| D437,210 S | 2/2001 | Borotto et al. |
| D451,364 S | 12/2001 | Borotto et al. |
| D451,371 S | 12/2001 | Borotto et al. |
| 6,536,726 B1 | 3/2003 | Tull |
| 6,594,860 B2 | 7/2003 | Czipri |
| 6,907,642 B1 | 6/2005 | Czipri |
| 7,077,906 B2 | 7/2006 | Colombo et al. |
| 7,210,871 B2 | 5/2007 | Slatter |
| 7,302,907 B2 | 12/2007 | Carlton |
| 7,309,054 B2 | 12/2007 | Slatter et al. |
| 7,334,956 B2 | 2/2008 | Taylor |
| 7,413,370 B2 | 8/2008 | Burnley |
| 7,461,995 B2* | 12/2008 | Burnley .................. B63B 17/02 403/122 |
| 7,523,906 B2* | 4/2009 | Bennett .................. F16M 13/02 248/288.31 |
| 7,674,063 B2* | 3/2010 | Jan ........................ F16C 11/069 403/120 |
| 7,726,618 B2* | 6/2010 | Pedemonte ........... F16C 11/106 248/229.14 |
| 7,753,612 B2* | 7/2010 | Bouru ................... F16C 11/045 403/123 |
| 7,921,513 B2 | 4/2011 | Burnley |
| 9,488,216 B2* | 11/2016 | Godiot ................ F16C 11/0614 |
| 2006/0087146 A1 | 4/2006 | Erskine et al. |
| 2008/0193205 A1* | 8/2008 | Peng .................. F16C 11/0604 403/114 |

\* cited by examiner

BALL AND SOCKET

FIELD OF THE INVENTION

The present invention relates generally to the field of joints. More particularly, the present invention relates to ball and socket joints in structures such tubes, pipes, bars, etc.

BACKGROUND

The use of collapsible structures is desired in a number of industries. One use of collapsible structures that can be found in many industries is for protection from the elements or weather, such as the sun, wind or rain. For example, in the marine industry, watercraft users utilize structures sometimes called bimini tops to protect the occupants of the watercraft from exposure to the elements. Other examples include tents and canopies.

As with most weather related accessories, the ability to employ the structure in undesirable weather and collapse and store the structure in desirable weather is advantageous. In the marine industry, the ability to easily deploy, properly tension the fabric and stow a structure, such as a bimini, is additionally advantageous for variety of other reasons such as when passing under a low bridge, when in a boat lift, when adding a boat cover, etc. Therefore, there is a need for a structure that can be moved between a deployed position and stowed position quickly and easily.

In the marine industry, some current biminis use a series of 'U' shaped structural members joined together. However, the junctions of the structural framework for such biminis may be irregular for a number of reasons. For example, the angle of the axis of rotation for one joint in a frame may not be the same as the angle of the axis of rotation of any other joint in the same frame or the same joint in another frame and may not be predictable. By way of another example, the path of rotation for a structural element of a junction may be arcuate, e.g. non-planar. Such irregular junctions may be because of manufacturing and installation tolerances, the desire to have a single bimini fit or retrofit a number of different marine vehicle profiles, or the additional cost to add additional bends or structures. For such junctions, having a variety of hinges or joints with a single axis of rotation at differing angles may be impractical due to cost and complexity of manufacture, or impossible with respect to structural elements with non-planar movements.

Currently, there are joints that can accommodate some irregular junctions, such as ball and socket, universal and heim bearing style joints. However, such joints have not been fully optimized. One problem with some such joints is that they allow rattling. This can be very inconvenient and annoying when such joints are used in structures that will often encounter vibrations, e.g. a boat on waves. Another problem with some such joints is that they must be permanently affixed to a structure and cannot later be moved or their location adjusted. Yet another problem with some such joints is that they are expensive due to the machining and/or installation of the joint. Another problem with some such joints is that they are made from heavy and/or expensive metal materials. Another problem with some such joints is that they have a low pull-out resistance. Yet another problem with some such joints is that they permit free movement and/or rotation of one part of the joint in relation to the other part of the joint. This can result in an increased likelihood of failure as the parts wear down from constant movement and friction.

Sometimes such joints designed to provide some tolerance in the angle of the axis of rotation of the joint, such as described above, are avoided due to cost, complexity of installation, likelihood of failure and/or weight, in place of joints that provide no tolerance in the angle of the axis of rotation of the joint. In order to obtain some tolerance to the angle in the axis of rotation of the joint, the joint is not tightly or securely attached to the frame structures comprising the junction. Although this may provide for some tolerance in the axis of rotation of the joint, it creates a safety issue and could increase the failure rate of the joint. Further, having a joint that is allowed to have free movement and/or not tightly or securely attached can allow a lot of play or movement when deployed and the watercraft is in motion. This can be not only inconvenient and noisy, but can also create a safety issue.

Further, the boating industry includes many recreational users. Recreational users may choose not to deploy such covers or enclosures or, worse yet, deploy them contrary to the manufacturer's instructions, so as to avoid the frustration, difficulty and/or annoyance. Such use can be unsafe and/or result in damage to the cover or enclosure.

Although the above example is illustrated through a description of a type of bimini top, other marine tops and accessories such as covers have similar issues as do other collapsible accessories in many different industries.

As such, there is a need for hardware that allows the angle of the axis of rotation to be adjusted and wherein the joint depresses rattling, cost and weight and has a higher pull-out resistance. There is also a need for hardware that can be selectively engaged, such that the parts of the joint are prevented from moving and/or rattling, and disengaged, such that the parts of the joint are not prevented from moving. There is also a need for hardware that can be easily and quickly transitioned from a locked position to unlocked position. There is also a need for hardware that can be securely and easily attached to frame structures and reduces the likelihood of failure. There is also a need for hardware that can be made from a material other than metals to reduce the cost and weight of the hardware.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

In one embodiment, the invention provides a joint for use in attaching two structures of a frame, such as a frame from a collapsible bimini top, tent or canopy. The joint includes a ball portion, forked portion and a pin. The ball portion has a ball with a bore formed therein. The forked portion has a first and second fork that form a socket, each of the first and second fork having a hole formed therein. The pin is sized to extend through the bore and each hole when the ball is within the socket to pivotally attach the ball portion and forked portion.

In another embodiment, a joint includes a first body having a ball and a sleeve being generally "U" shaped and sized to receive the ball. The joint also includes a second body having a socket sized and shaped to receive the sleeve and a fastener. The fastener is positioned through a first portion of the socket, the sleeve and the ball and engaged with a second portion of the socket to retain the ball in the sleeve and the sleeve in the socket.

In another embodiment, a joint for connecting a first structure to a second structure includes a forked body, a ball body and a pin. The forked body further has a first prong with a first hole formed therein, a second prong with a second hole formed therein and a concavity. The first and second prongs form a socket. The concavity is on an end of the forked body adapted to receive the first structure and is secured to the first structure by a fastener that extends through the first structure and into the end of the forked body. The ball body further includes a ball portion with a bore formed therein and a boss adapted to be received by the second structure. The pin is received within the first hole, bore and second hole when the ball portion is within the socket. The bore is larger than the pin such that the ball portion can rotate about an axis different than an axis of the pin when the pin is in the disengaged position.

Other objects and advantages of the invention will become apparent hereinafter.

DETAILED DESCRIPTION

A joint 10 in accordance with the present invention provides an adjustable angle to the axis of rotation that prohibits rattling and has an increased pull-out resistance.

The embodiment of the joint 10 seen in FIGS. 1-7, is designed to cooperate with a circular tube, although the joint could be adapted to fit a variety of shapes and sizes of structures, both hollow and solid. The joint 10 is intended to rotatably join a first structure 12a to a second structure 12b. The joint 10 permits the angle of the axis of rotation to be adjusted.

Figure 1:
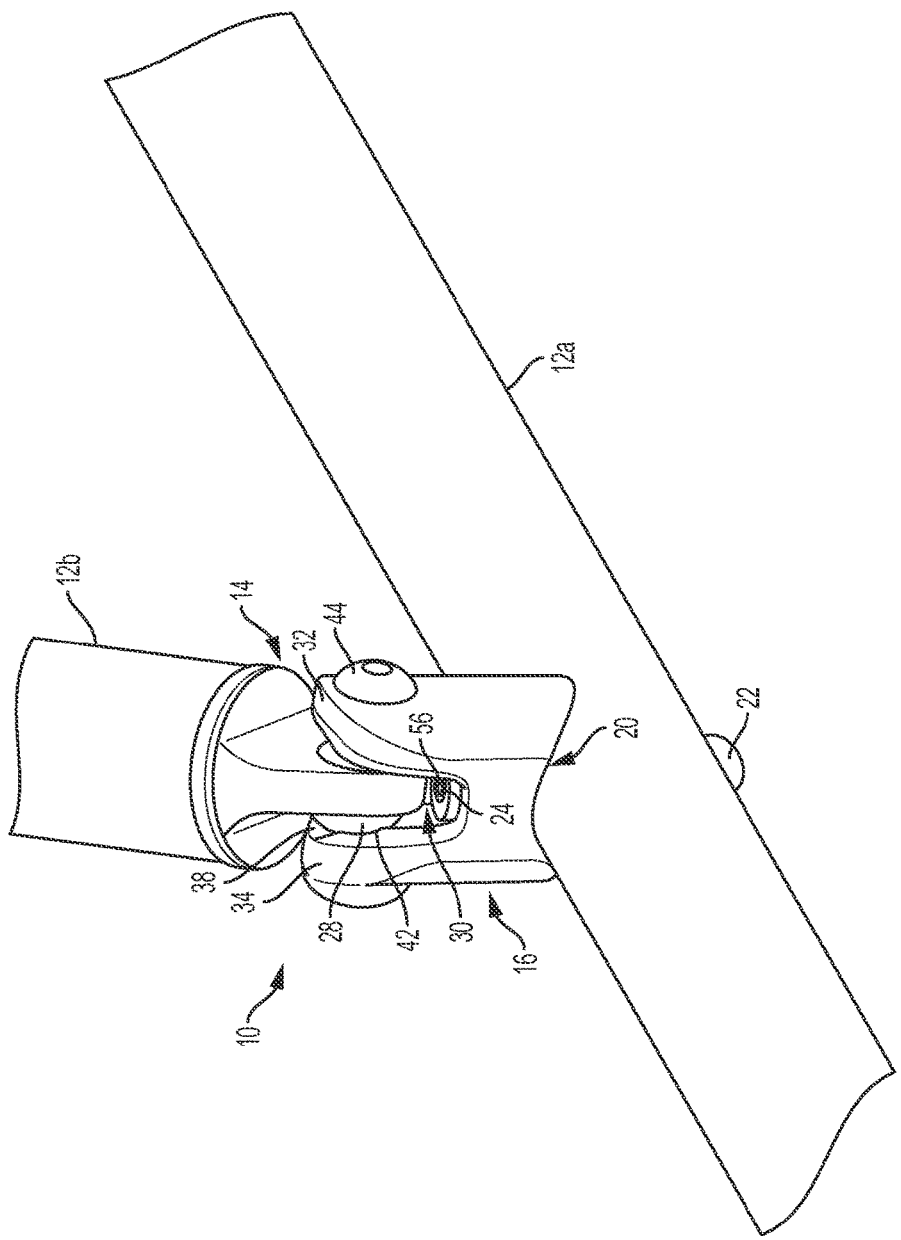
FIG. 1 is a perspective view of a joint in a frame in accordance with one embodiment of the present invention.
Figure 2:
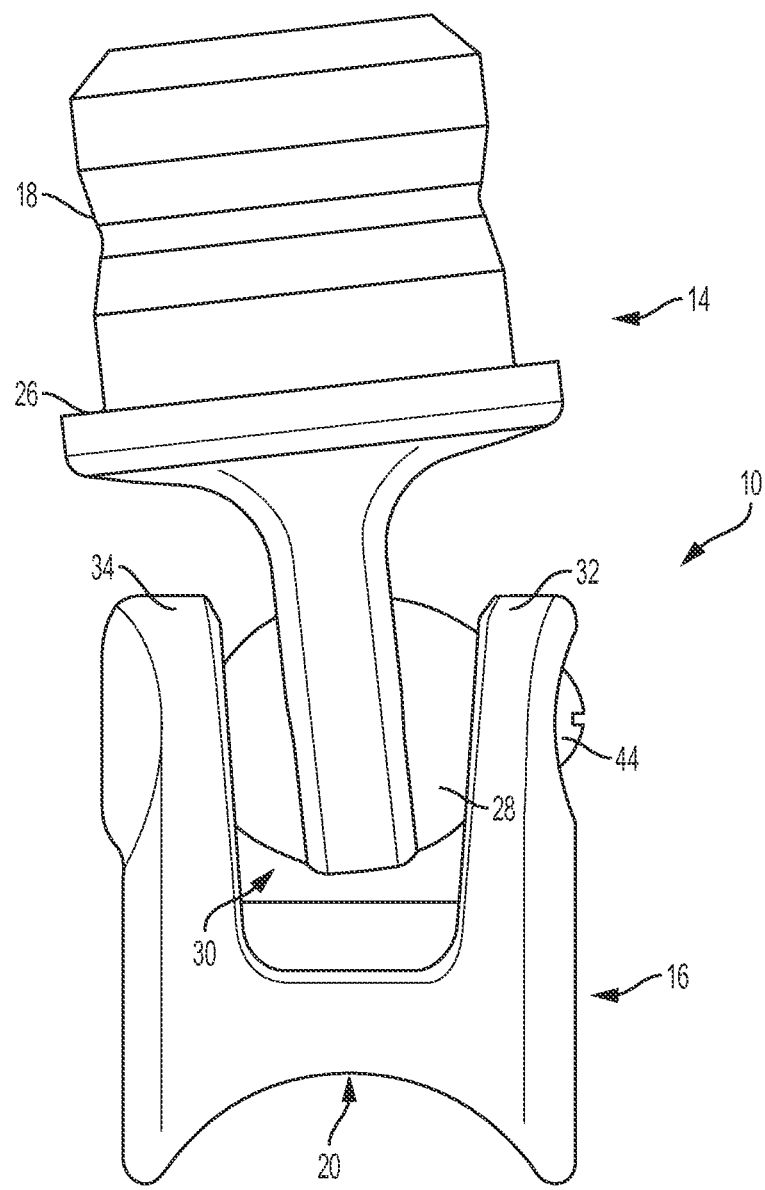
FIG. 2 is a front elevation view of the joint in FIG. 1 without the frame.
Figure 3:
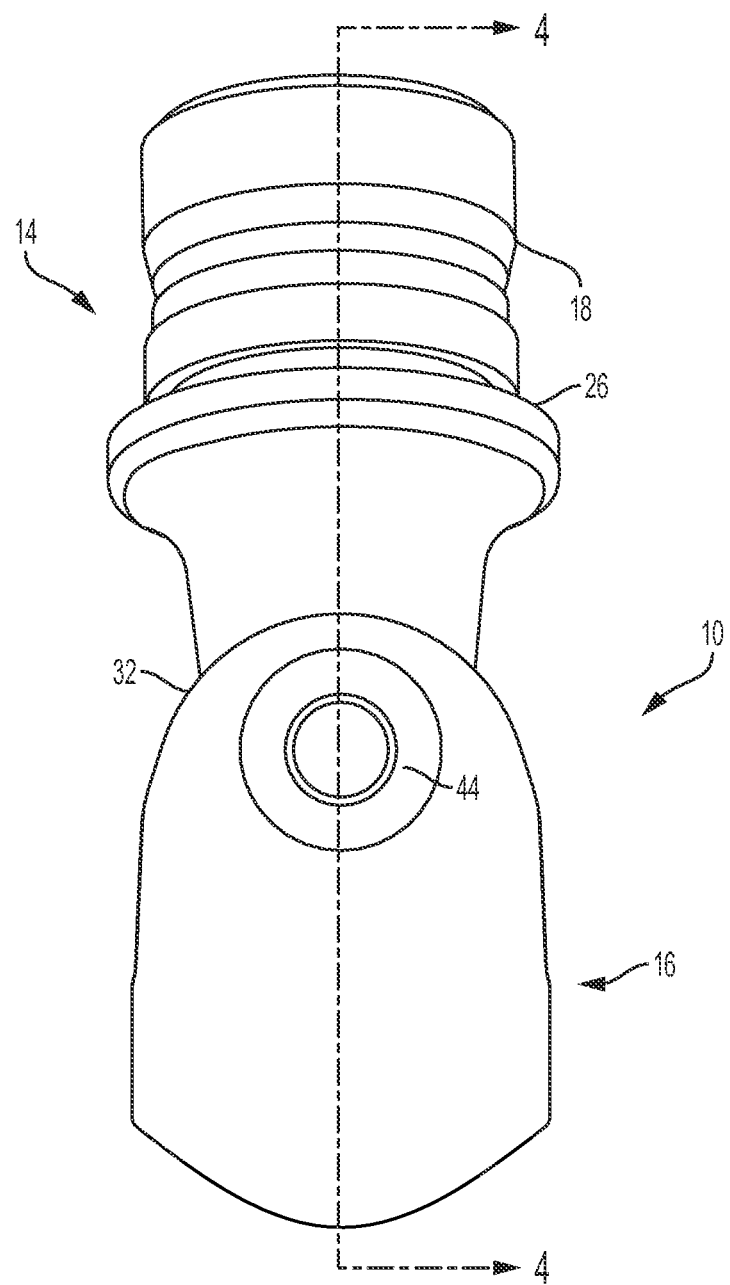
FIG. 3 is a side elevation view of the joint in FIG. 1 without the frame.

As can be more clearly seen in FIG. 1, the joint 10 has a first or ball body or portion 14 and a second or forked body or portion 16. The first body 14 of the joint 10 is connected or attached to an end of a first structure 12b and the second body 16 of the joint is connected or attached to the first structure 12a at a desired location along the first structure. In the embodiment shown in FIG. 4, the first body 14 has a boss 18 that slides into the hollow end portion of the second structure 12b. The boss 18 could be held within the second structure 12b by any means known for connecting two such structures in the industry, for example crimping, riveting, screwing, bolting, adhering, welding, etc., the use of which would not defeat the spirit of the invention. Although the first body 14 is shown attached to the second structure 12b by inserting a portion of the first body into the structure, other means of connecting two such structures are known in the art, such as by the insertion of the structure into the first body, integrally forming or over molding the first body to the structure, etc., the use of which would not defeat the spirit of the invention.

Figure 4:
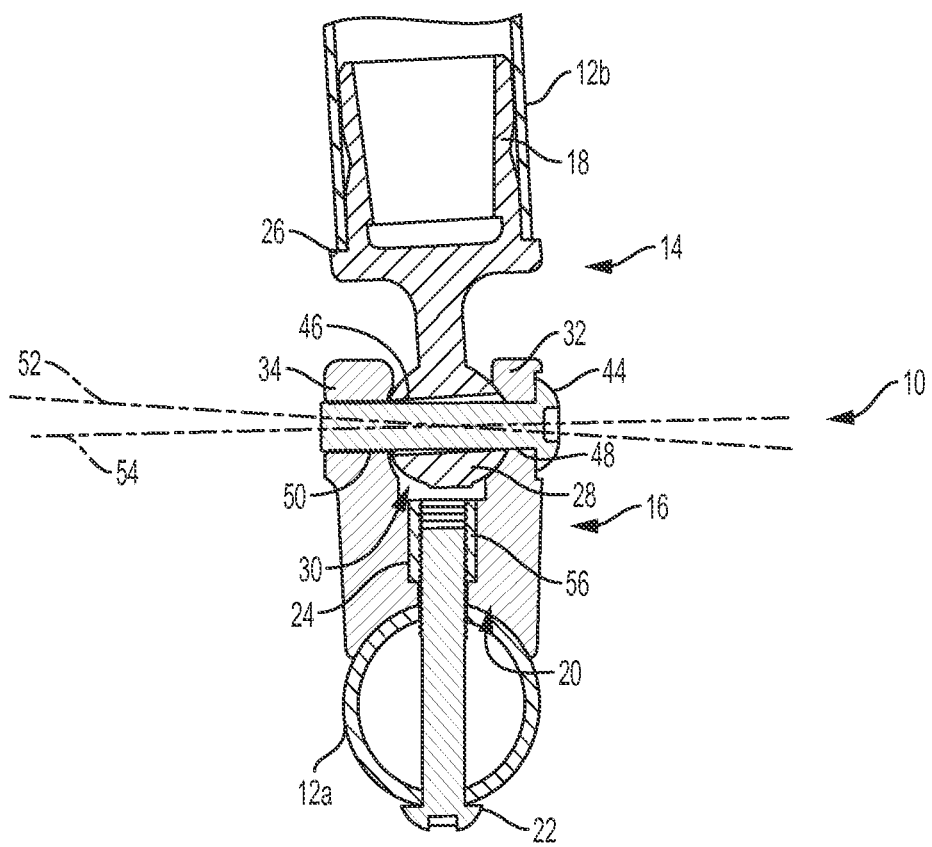
FIG. 4 is a cross-sectional view of the joint in FIG. 1 taken along the line 4-4.
Figure 5:
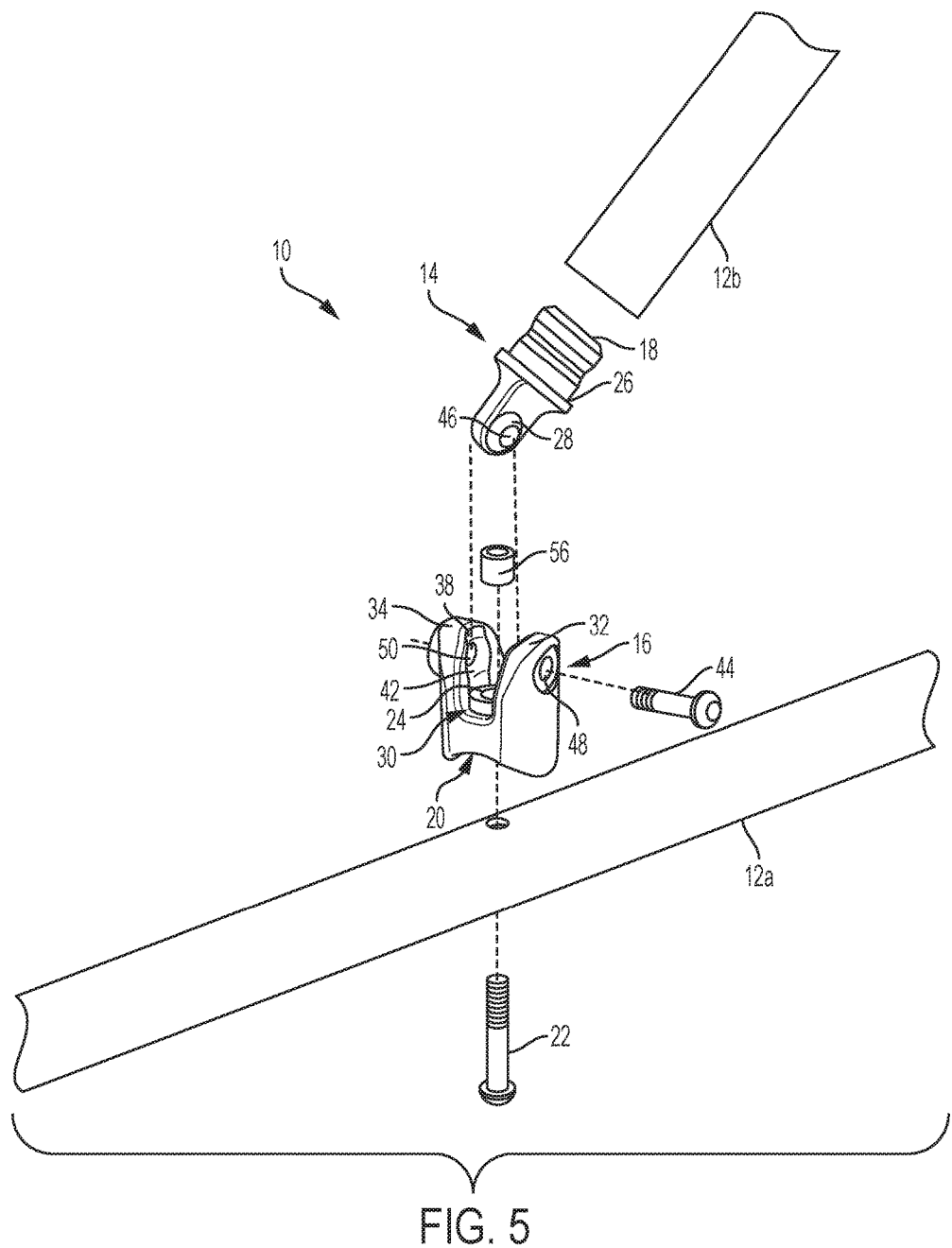
FIG. 5 is an exploded perspective view of the joint in FIG. 1.
Figure 6:
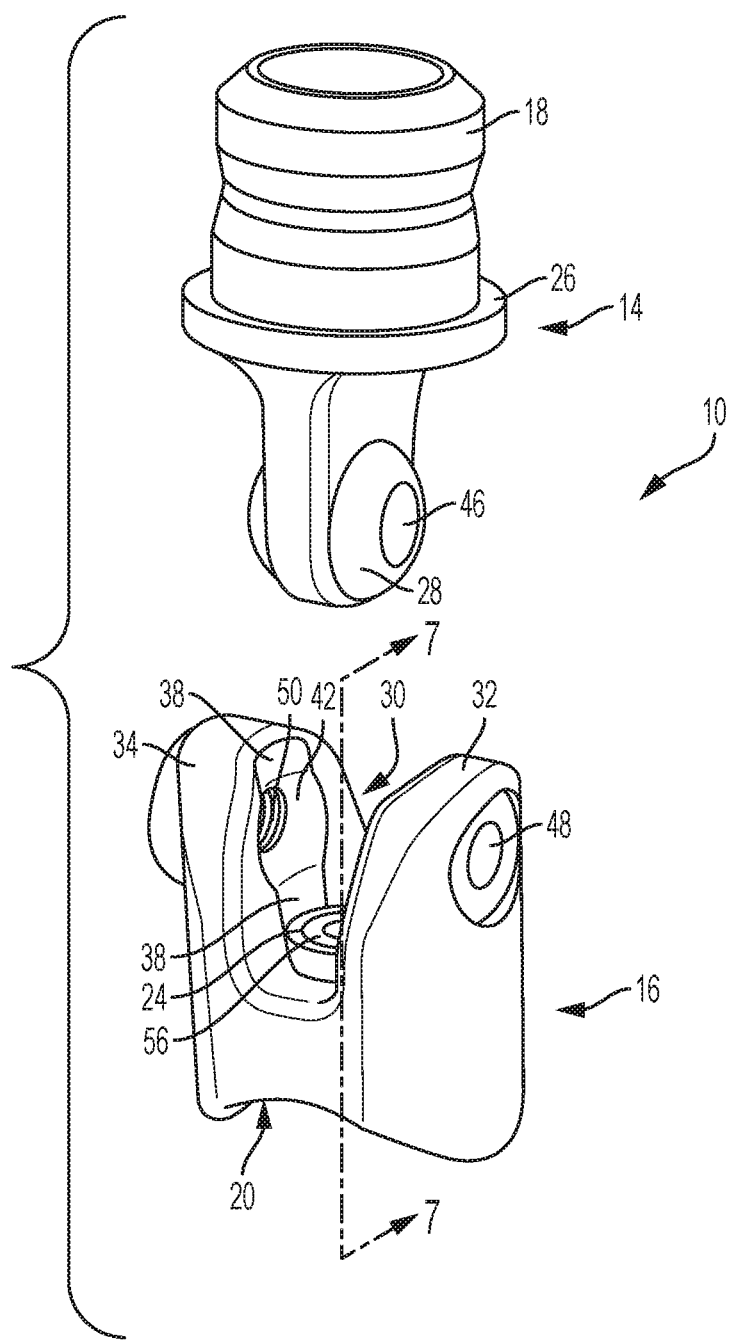
FIG. 6 is an enlarged, exploded perspective view of the joint in FIG. 1.

In the embodiment shown in FIG. 4, the second body 16 is shown connected or attached to the exterior surface of the first structure 12a. The second body 16 can be positioned anywhere longitudinally along the second structure 12b. The mating end or concavity 20 of the second body 16 may be shaped and sized in accordance with the profile of the first structure 12a so that the second body and the first structure form a mating attachment. Although the second body 16 is shown attached to the first structure 12a by inserting a bolt 22 through holes in the first structure and into a hole or passage 24 in the second body, other means of connecting two such structures are known in the art, such as by riveting, threading, heat shrinking, staking, screwing, adhering, welding, integrally forming or over molding the body to the structure, etc., the use of which would not defeat the spirit of the invention.

As seen in FIG. 4, the first body 14 may also include a shoulder 26 by the boss 18, which promotes and facilitates easy and quick installation and/or attachment of the body with the structure 12b by, for example, setting the depth at which the boss is inserted into or received by the structure, aligning holes in the boss and structure for insertion of a screw or bolt, etc. In one embodiment, the boss 18 can be hollow to allow for blind fastening of the first body 14 to the second structure 12b.

Figure 7:
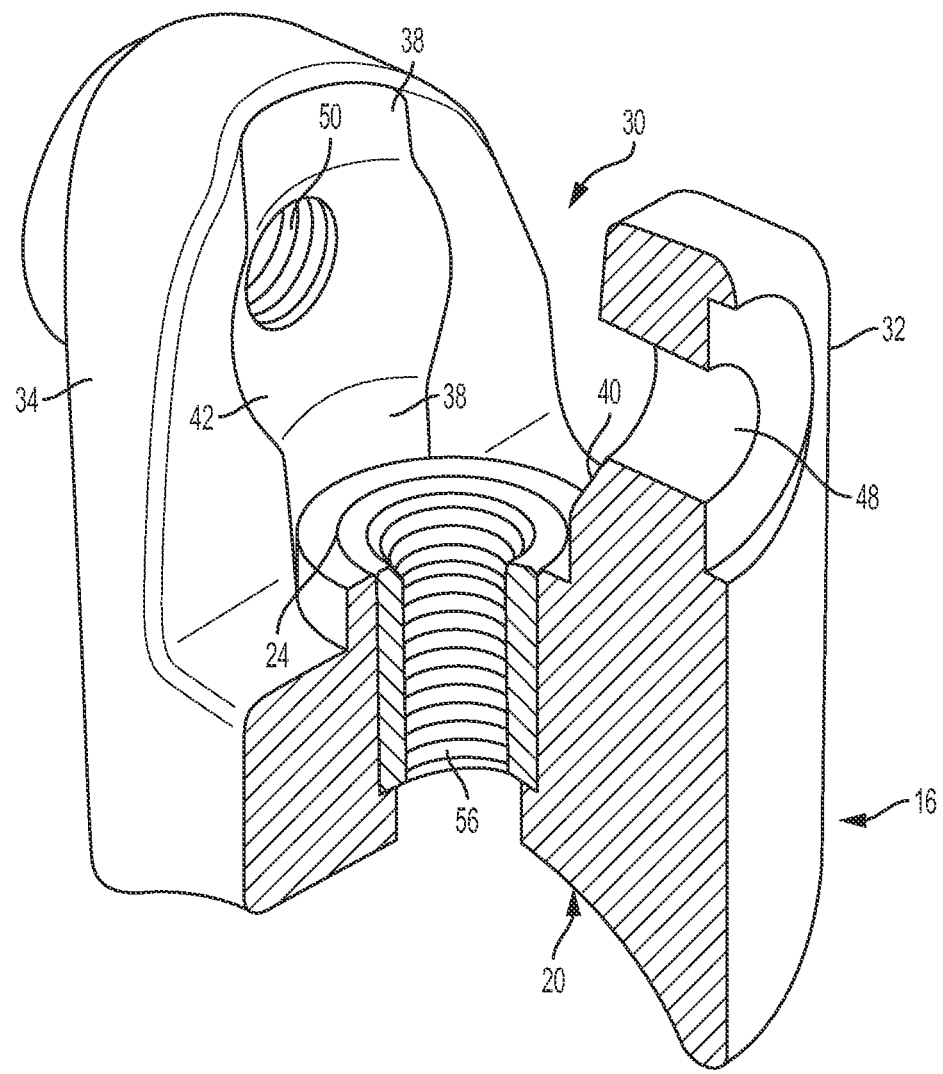
FIG. 7 is an enlarged, perspective partial cross-sectional view of a portion of the joint in FIG. 6 taken along the line 7-7.
Figure 8:
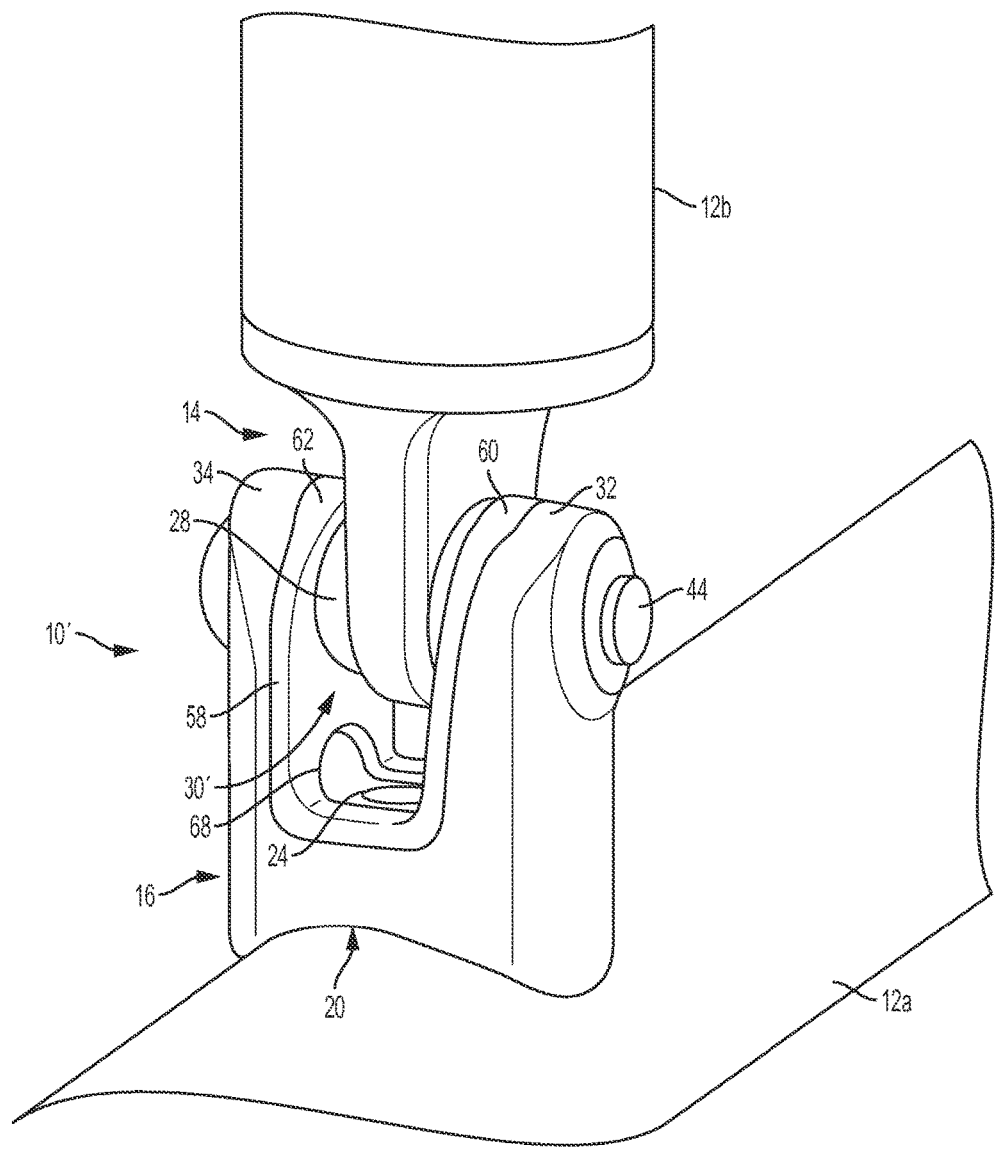
FIG. 8 is a perspective view of a joint attached to a frame in accordance with another embodiment of the present invention.
Figure 9:
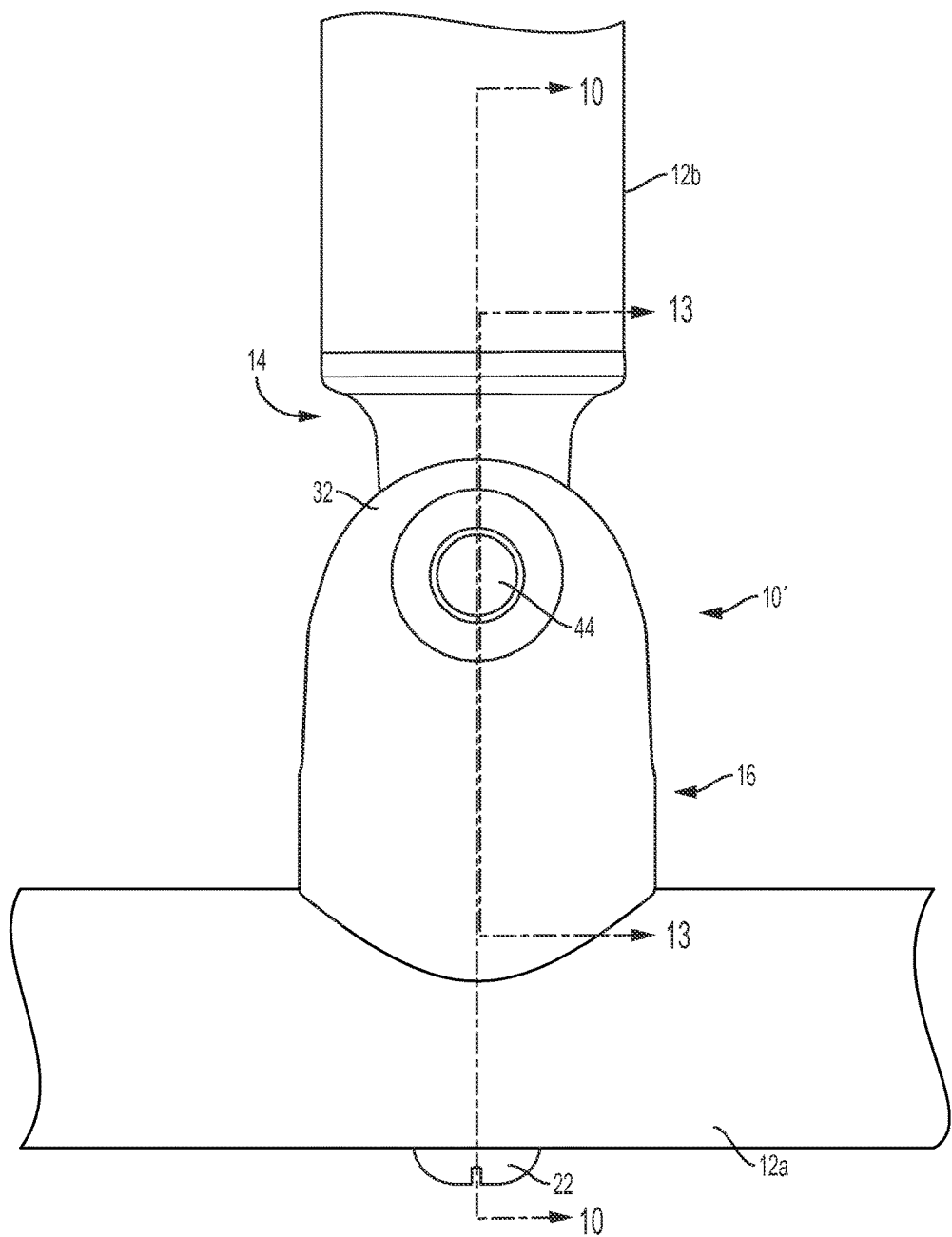
FIG. 9 is a side elevation view of a joint attached to a frame.

The first body 14 is connected to the second body 16 through a ball and socket connection. As seen in FIGS. 1-2 and 4-6, the first body 14 has a ball 28 at an end opposite the boss 18 and the second body 16 has a socket 30 at an end opposite the mating end 20. As seen in FIG. 7, the socket 30 of the second body 16 is formed generally by two forks, or prongs 32, 34 that extend from the mating end 20. In the embodiment shown in FIG. 7, the inside or socket-side of each fork 32, 34 has a recess 36, 38 extending the length of each fork. The recesses 36, 38 permit the ball 28 of the first body 14 to be more easily inserted into the socket 30 of the second body 16 and provides room for a head of a screw or bolt to be inserted down through the socket 30 of the second body, such as, for example, when two joints are arranged in parallel as described further below and shown in FIG. 16.

A spherical indentation 40, 42 is located midway down the inside of each fork 32, 34, that generally matches the shape of the ball 28. The distance between the first recess 36 and second recess 38 is sized slightly smaller than the size of the ball 28, while the distance between the first spherical indentation 40 and the second spherical indentation 42 is generally the size of the ball. Therefore, to get the ball 28 seated in the space between the first and second spherical indentations 40, 42, force must be applied to the ball such that the ball causes the first and second forks 32, 34 to deform and separate slightly until the ball reaches the first and second spherical indentations 40, 42. After the ball 28 reaches the first and second spherical indentations 40, 42, the first and second forks 32, 34 will undeform and return to their original orientation, or close thereto, to hold the ball within the socket 30. In this position, a light pressure or force may be exerted on the ball 28 to hold the ball within the first and second spherical indentations 40, 42.

The first body 14 and second body 16 are also connected, such as, for example, by a pin or fastener 44, so as to be pivotally attached. In the embodiment shown in FIG. 4, the ball 28 has a bore 46 that is larger than the pin 44. The first and second forks or portions 32, 34 also have a hole 48, 50 that is sized just large enough for the pin 44 to pass through. One of the holes 48, 50 may be threaded such that the pin 44 can be inserted through one of the holes, through the bore 46 in the ball 28 and then into threaded engagement via a plurality of threads with the threaded hole. Because the bore 46 is slightly larger than the pin 44, the angle of the axis 52 of the bore, or axis of rotation, can be adjusted to be at an angle other than the longitudinal axis 54 of the pin 44, while still permitting rotation around the axis of rotation.

In one embodiment, the first body 14 and thereby the second structure 12b can be rotated with respect to the second body 16 and the first structure 12a even when the pin 44 is fully tightened down. The pin 44 helps increase the pull-out resistance strength of the joint 10 and the pressure exerted by the first and second spherical indentations 40, 42 on the ball 28 helps reduce any rattling.

In another embodiment, the pin 44 may be moved between a disengaged, unlocked or first position and an engaged, locked or second position by adjusting or rotating the pin. When the pin 44 is not fully tightened, such as after having been adjusted or rotated in a first direction to loosen the pin, e.g. counterclockwise, the first and second forks 32, 34 can remain generally in their original positions, wherein light to no pressure or force is exerted on the ball 28. In this position, the first body 14 and thereby the second structure 12b can be rotated with respect to the second body 16 and the first structure 12a. This disengaged position is useful when installing or attaching the joint 10 and/or deploying or collapsing a structure of which the joint is a part.

When the pin 44 is fully tightened, such as after having been adjusted or rotated in a second direction, e.g. clockwise, the pin causes the first and second forks 32, 34 to flex inward towards the ball 28 to apply additional force or friction on the ball to help prohibit rattling of the joint, but permit rotation.

In another embodiment, the joint 10 can be made from a material with high strength, that is light weight and permits rotation of the ball 28 within the socket 30 when the joint is disengaged and prevents rotation of the ball 28 within the socket 30 when the joint is engaged due to a higher creep resistance, such as an acetal homopolymer resin, e.g. Delrin® resin. When the structure is in the desired employed or collapsed position, the pin 44 can be tightened down, thereby causing the first and second forks 32, 34 to flex inwards towards the ball 28 to apply pressure, force and/or friction on the ball and thereby prevent the first and second bodies 14, 16 from moving.

The joint 10 could alternatively be made from a number of other materials that exhibit properties that are desirable for a particular function or feature, by way of example only, nylon 6 or polycaprolactam, nylon 12 or long glass fiber reinforced acetal. The joint 10 could also be made from metals such as stainless steel to provide an even greater strength, as explained in more detail below.

Figure 15:
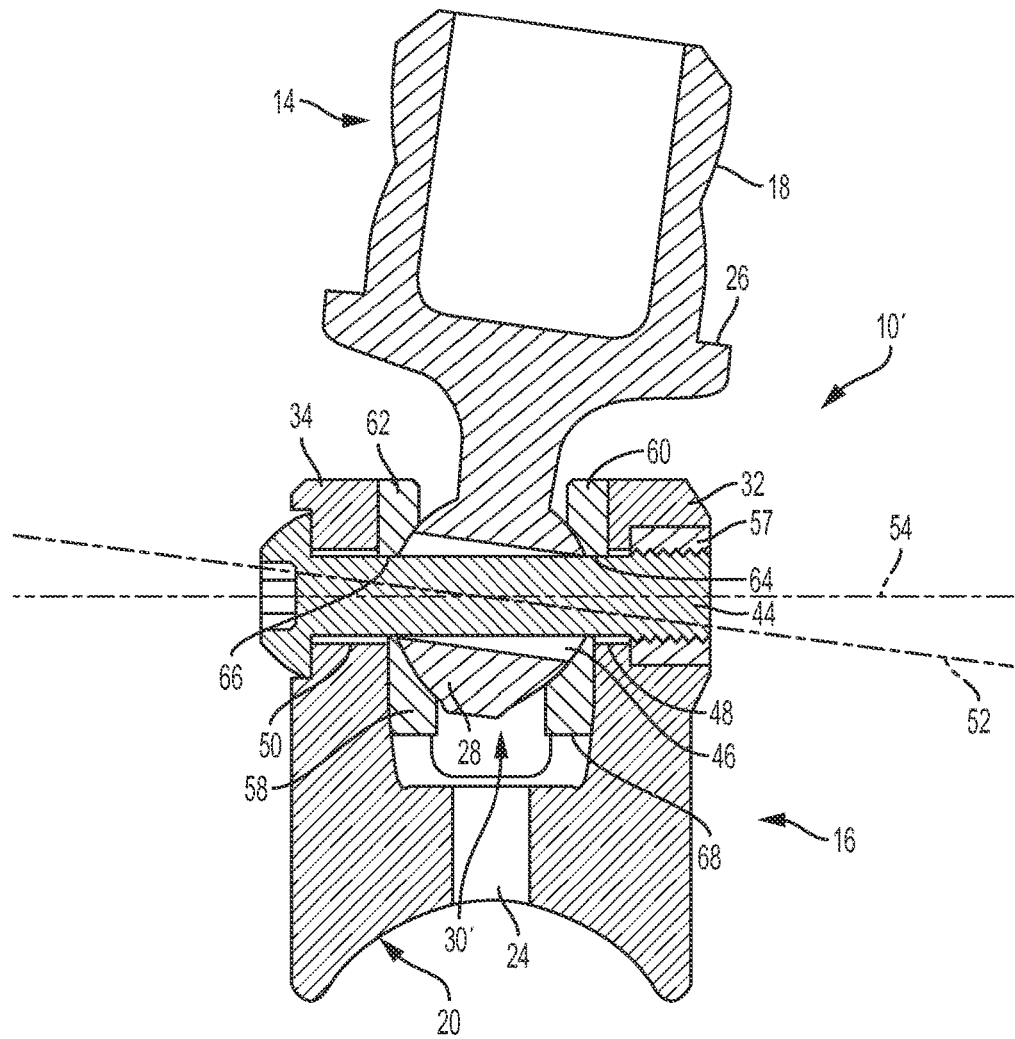
FIG. 15 is a perspective cross-sectional view of a joint similar to that in FIG. 13, but a nut.

In order to reduce the risk of failure from stripping and promote a longer life of the joint 10, an insert 56, e.g. a shaft, nut, etc., with interior threads may be placed in the hole 24 in the second body 16 to threadingly engage the bolt 22. The hole 24 could also be threaded or shaped and the exterior of the insert 56 threaded or shaped to promote a more secure attachment there-between. The insert 56 or bolt 22 could be made of a material that is stronger and less likely to strip such as metal, for example, stainless steel. Similarly, the holes 48, 50 could have an insert or be sized and shaped to receive an insert or nut 57 to engage the pin 44 as seen in FIG. 15. Alternatively, a nut, for example a wing nut 59, could be used to engage the pin on the exterior side of one of the forks 32, 34 so as to make locking and unlocking the joint 10 quicker and easier as seen in FIG. 11.

In another embodiment seen in FIGS. 8-15, the joint 10' is largely made from stainless steel. Because a steel ball would not adequately rotate within a stainless steel socket due to its higher coefficient of friction, a sleeve is inserted between the ball and socket to allow the ball to more freely rotate. The sleeve could be made from any material that exhibits properties that are desirable for a particular function or feature, by way of example only, acetal homopolymer resin such as a Delrin® resin, nylon 6 (polycaprolactam), nylon 12 or long glass fiber reinforced acetal. Apart from the socket and sleeve, which will be described further below, the stainless steel joint 10' is largely as described with respect to the joint 10 previously described and all common reference numbers indicate parts previously described, except for the material from which they are made.

Figure 10:
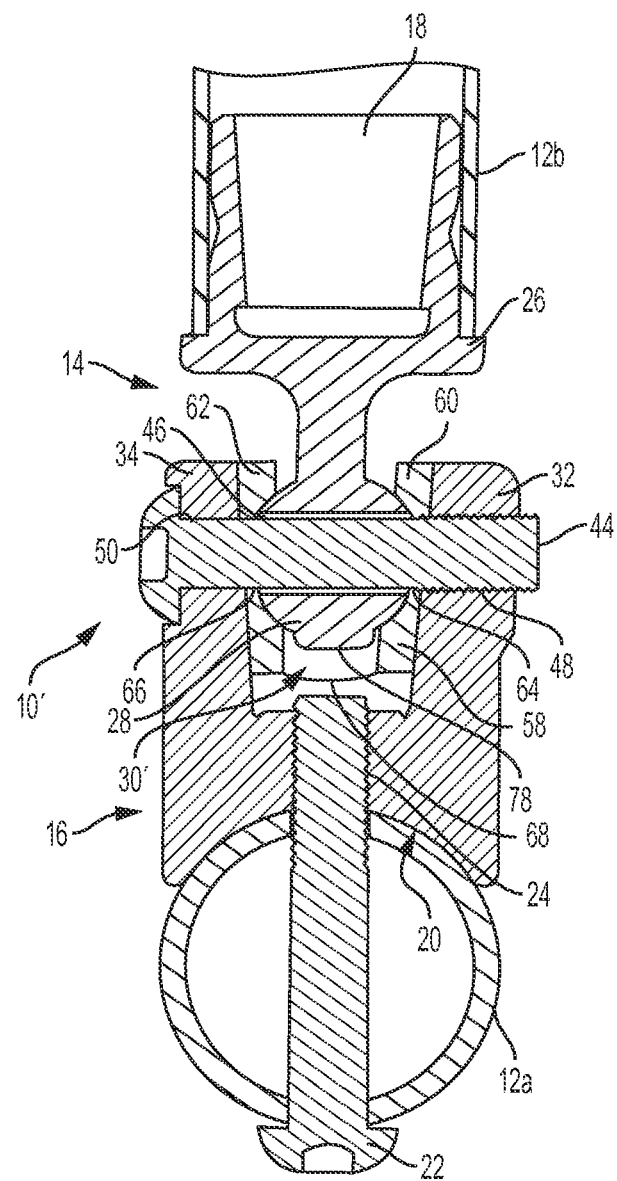
FIG. 10 is a cross-sectional view of the joint in FIG. 9 taken along the line 10-10.

As seen most clearly in FIG. 10, the socket 30' is formed by the first and second forks 32, 34. Unlike the embodiment seen in FIGS. 1-7, the first and second forks 32, 34 of the embodiment seen in FIG. 10 have no recesses or indentations. Instead the socket-side or interior portions of the first and second forks 32, 34 are generally smooth and create a trapezoidal socket 30'. Although the embodiment shown in FIG. 10 shows the socket-side or interior portions of the first and second forks 32, 34 as generally smooth, the interior portions could have groves, recesses, indentations, projections, etc. for any number of reasons including to help orient the sleeve as it is inserted into the socket 30' or to create an interlocking fit with the sleeve.

Figure 11:
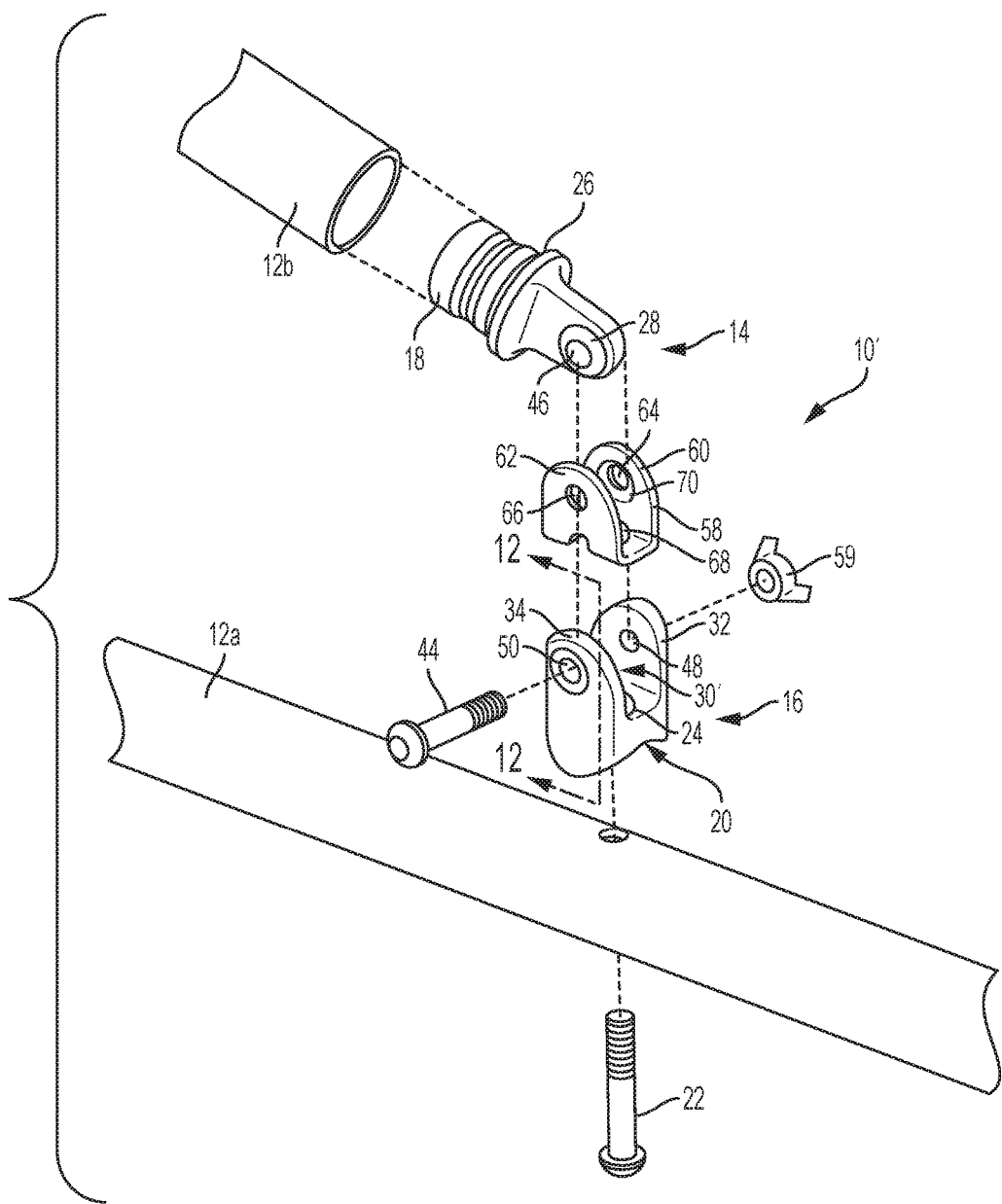
FIG. 11 is an exploded perspective view of a joint as in FIG. 8 with a nut.
Figure 12:
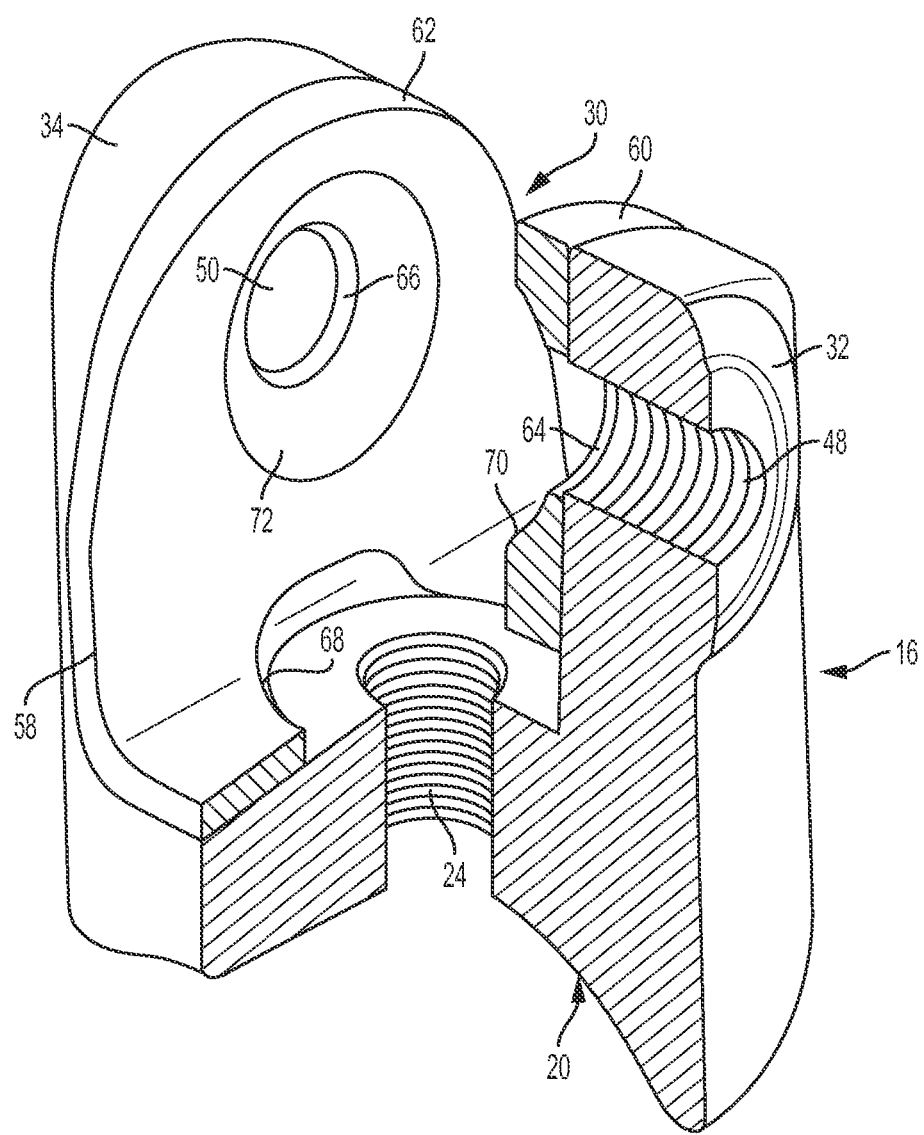
FIG. 12 is an enlarged, perspective partial cross-sectional view of a portion of the joint in FIG. 11 taken along the line 12-12.
Figure 13:
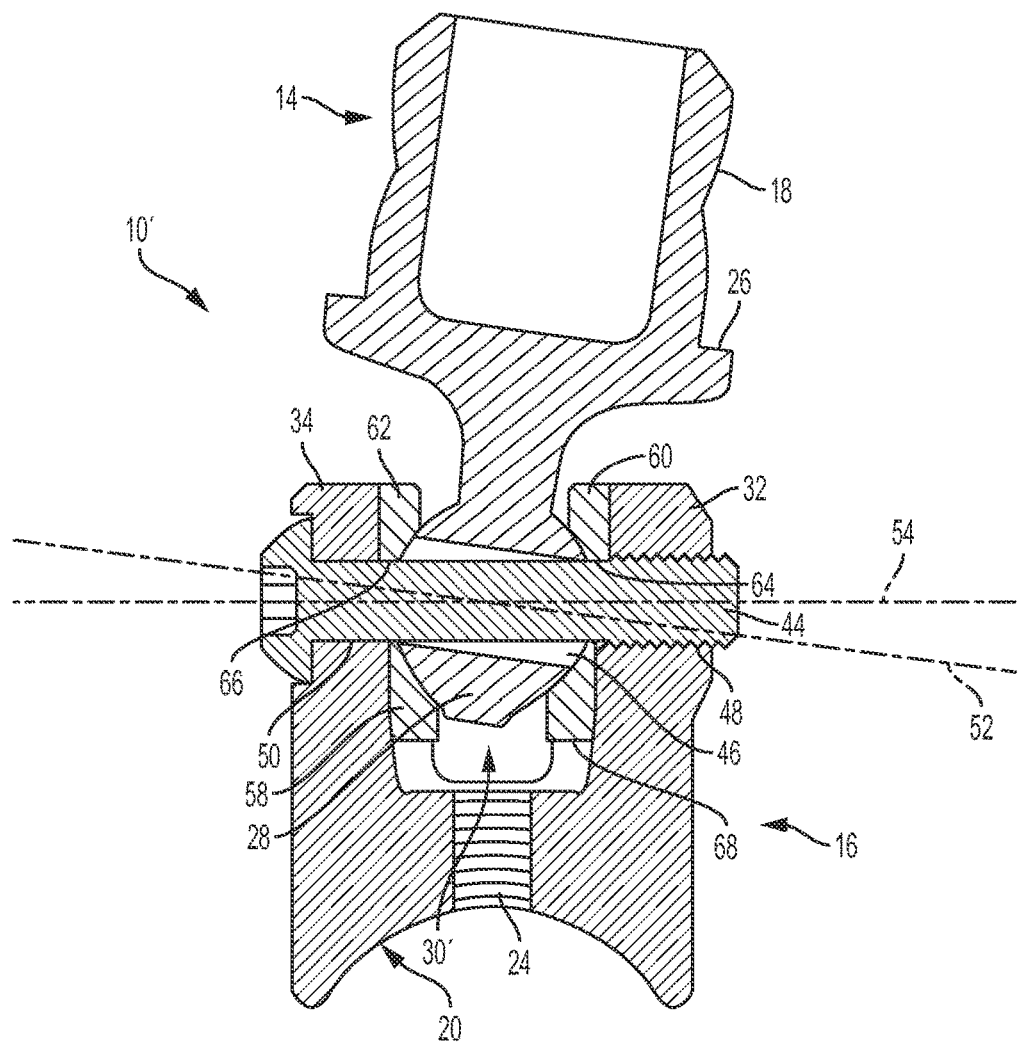
FIG. 13 is a perspective cross-sectional view of the joint in FIG. 9 unattached to a frame taken along the line 13-13.

As most clearly seen in FIG. 11, the sleeve 58 is sized and shaped to fit into the interior space between the first and second forks 32, 34 or socket 30'. The sleeve 58 is generally 'U' shaped with a first and second tang 60, 62 each having a hole 64, 66 that is positioned to line up with the holes 48, 50 in the first and second forks 32, 34 for the pin 44 to extend through, respectively. The sleeve 58 may also have a cutout 68 at its base to permit room for a head of a screw or bolt to be inserted down through the sleeve and into the hole 24, such as, for example, when two joints are arranged in parallel as described further below and shown in FIG. 16. A spherical dimple 70, 72 is located midway down each of the first and second tang 60, 62 on the interior or socket-side, that generally matches the shape of the ball 28.

The distance between the spherical dimples 70, 72 is sized slightly smaller than the size of the ball 28, while the distance between the first and second forks 32, 34 is sized just larger enough that the sleeve 58 can be slid into the socket 30'. To join the first and second bodies 14, 16, the ball 28 is seated in the space between the spherical dimples 70, 72 in the sleeve 58. Force must be applied to the ball 28 such that the ball causes the first and second tangs 60, 62 to separate slightly until the ball reaches the spherical dimples 70, 72. After the ball 28 reaches the spherical dimples 70, 72, the first and second tangs 60, 62 will return generally to their original orientation to hold the ball within the sleeve 58. The sleeve 58 can then be set between the first and second forks 32, 34. A pin 44 can then be inserted through the hole 50 in the second fork 34, through the hole 66 in the second tang 62, through the bore 46 in the ball 28, through the hole 64 in the first tang 60 and then into threaded engagement with the hole 48 in the first fork. Because the bore 46 is slightly larger than the pin 44, the angle of the axis 52 of the bore, or axis of rotation, can be adjusted to be at an angle other than the longitudinal axis 54 of the pin 44, while still permitting rotation around the axis of rotation.

In one embodiment, the first body 14 and thereby the second structure 12b can be rotated with respect to the second body 16 and the first structure 12a even when the pin 44 is fully tightened down. The pin 44 helps increase the pull-out resistance strength of the joint 10' and the pressure exerted by the first and second spherical dimples 70, 72 on the ball 28 helps reduce any rattling.

In another embodiment, the pin 44 may be moved between a disengaged, unlocked or first position and an engaged, locked or second position by adjusting or rotating the pin. When the pin 44 is not fully tightened, such as after having been adjusted or rotated in a first direction to loosen the pin, e.g. counterclockwise, the first and second forks 32, 34 and first and second tangs 60, 62 can remain generally in their original positions, wherein light to no pressure or force is exerted on the ball 28. In this position, the first body 14 and thereby the second structure 12b can be rotated with respect to the second body 16 and the first structure 12a. This disengaged position is useful when installing or attaching the joint 10' and/or deploying or collapsing a structure of which the joint is a part.

When the pin 44 is fully tightened, such as after having been adjusted or rotated in a second direction, e.g. clockwise, the pin causes the first and second forks 32, 34 and first and/or second tangs 60, 62 to flex inward towards the ball 28 to apply additional force or friction on the ball to help prohibit rattling of the joint, but permit rotation.

In another embodiment, the first and second tangs 60, 62 can be made from a material with high strength, that is light weight and permits rotation of the ball 28 within the socket 30 when the joint is disengaged and prevents rotation of the ball 28 within the socket 30 when the joint is engaged due to a higher creep resistance, such as an acetal homopolymer resin, e.g. Delrin® resin. When the structure is in the desired employed or collapsed position, the pin 44 can be tightened down, thereby causing the first and second forks 32, 34 and/or first and second tangs 60, 62 to flex inwards towards the ball 28 to apply pressure, force and/or friction on the ball and thereby prevent the first and second bodies 14, 16 from moving.

Because the embodiment of the joint 10' shown in FIGS. 8-15 is made from metal, no insert is needed for the holes 24, 48, 50, 64, 66, although an insert could be used as could the holes be sized to hold a nut.

Alternatively a joint 10 as described above could be made from a metal material and the head and/or or portion of the socket, for example the spherical indentations 40, 42 or spherical dimples 70, 72, made from a material that exhibits properties that are desirable for a particular function or feature, such as, for example, allowing rotation of the ball when the joint is in the first position and preventing rotation of the ball when the joint is in the second position. This could be accomplished by a number of means for making a part from two different materials, including adhering, screwing, bolting, welding, heat shrinking, insetting, fusing, bonding, over-molding, etc.

Figure 14:
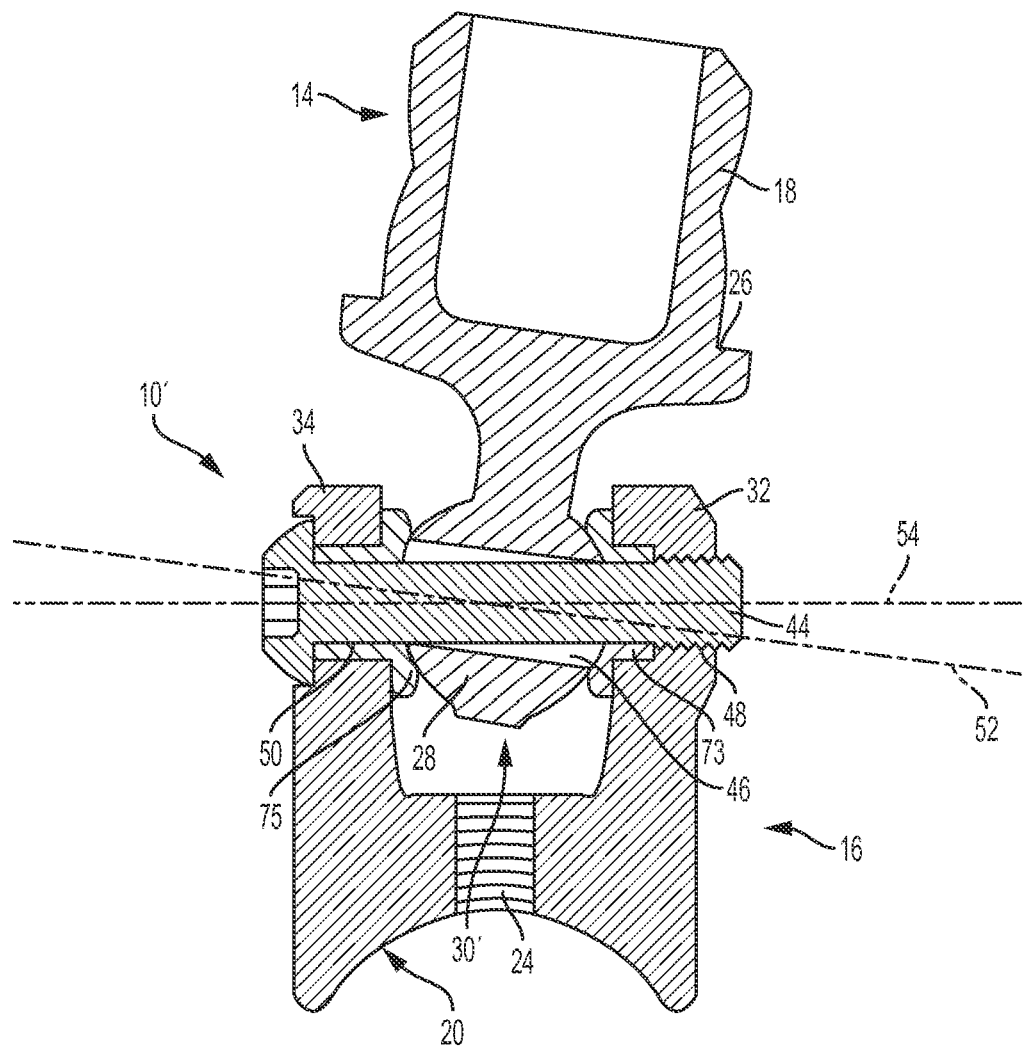
FIG. 14 is a perspective cross-sectional view of a joint similar to that in FIG. 13, but with plugs.

For example, as seen in FIG. 14, a plug 73, 75 can be inserted into the hole 48, 50 on each forks 32, 34 respectively. The plugs 73, 75 can be cupped or otherwise shaped and sized so as to allow the ball 28 to be inserted between the plugs. One of the holes 48, 50 can be partially threaded so as to engage the plurality of threads from the pin 44. The plug 73 for the partially threaded hole 48 can also be shorter so as not to interfere with the threads of the hole. Alternatively, the pin 44 could be sized such that a nut on the outside of one of the forks 32, 34 could engage the plurality of threads of the pin.

The forks 32, 34 of the joint 10 and/or the sleeve 54 and/or forks 32, 34 of the joint 10' could be sized so as to exert a desired amount of force on the ball 28 when the joint 10, 10' is unlocked in order to set the ease at which the joint is moved. In some applications, it may be desirable to have a joint that is more difficult to move so as to prevent unwanted movement, e.g. from wind, and to help hold the joint in a desired position while locking the joint. In other applications, it may be desirable to have a joint that is more easily moved so as to make the joint and frame easier to deploy and collapse.

Figure 16:
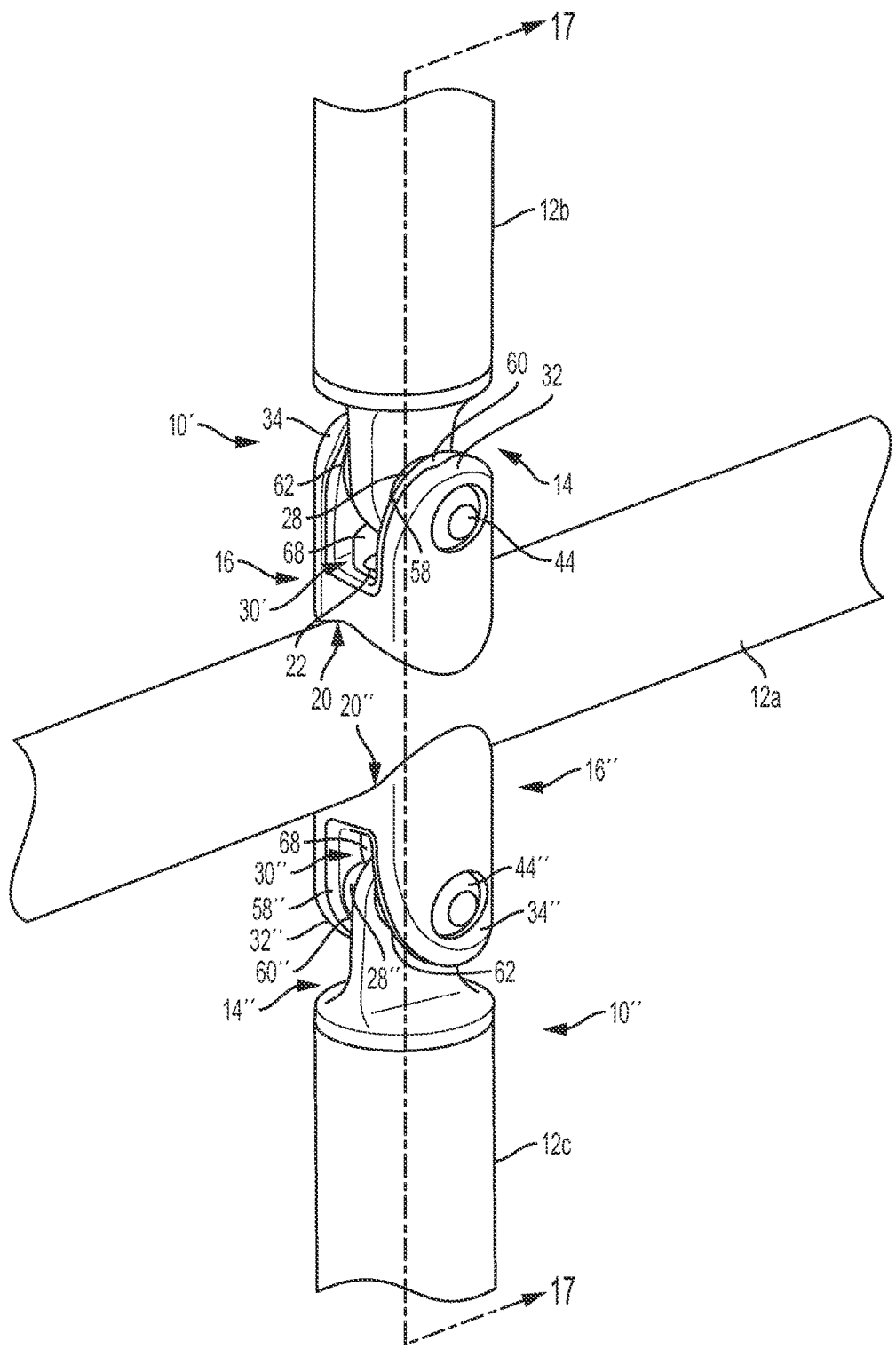
FIG. 16 is a perspective view of two joints arranged in parallel in a frame in accordance with another embodiment of the present invention.
Figure 17:
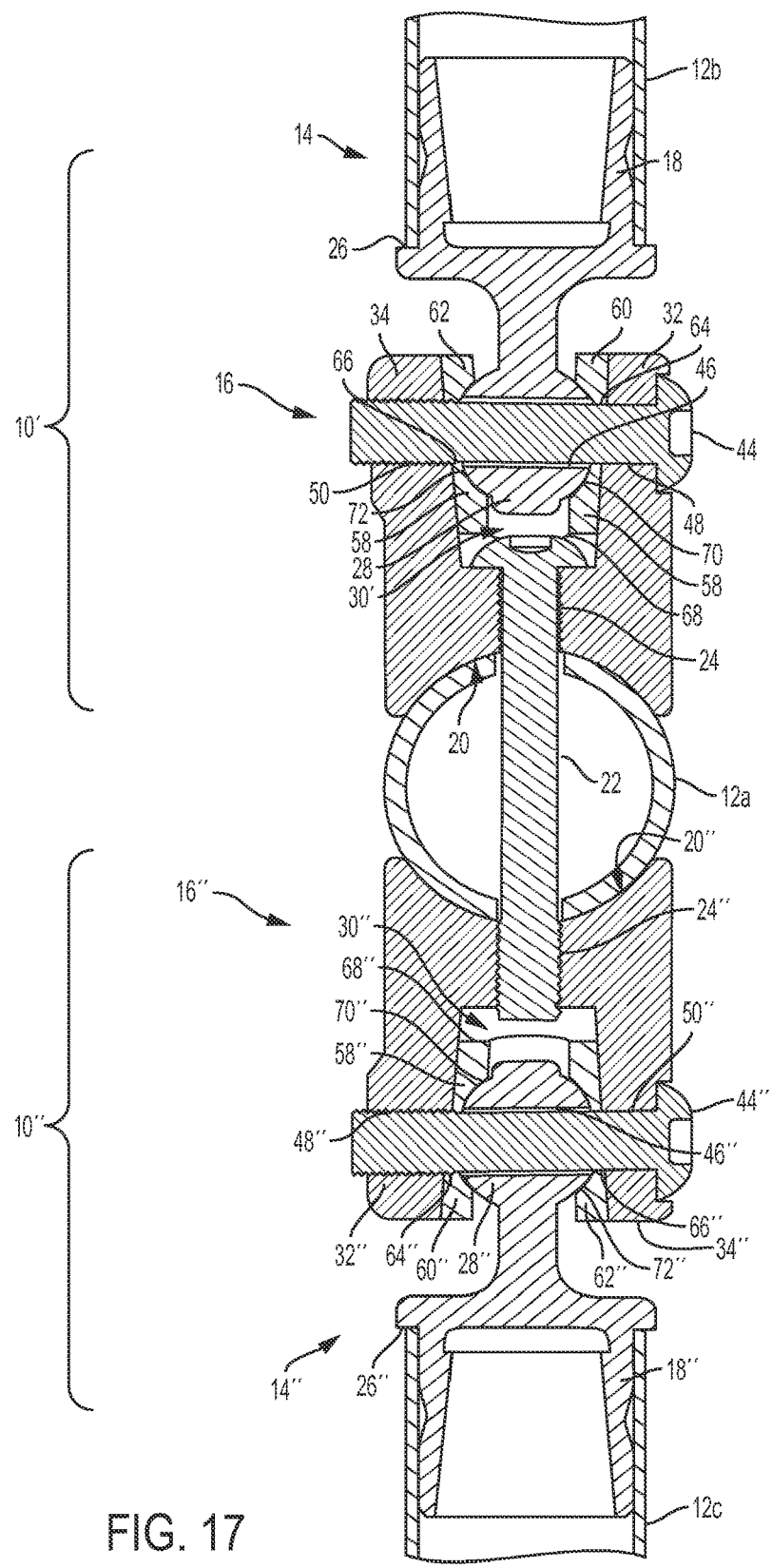
FIG. 17 is a cross-sectional view of the joints in FIG. 13 taken along the line 17-17.

The joint can also be used in parallel as seen in FIGS. 16-17. When two joints 10', 10" are used in parallel, a bolt 22 can be inserted down through the sleeve 58 and into the hole 24 of the second body 16 of the first joint 10' until the head of the bolt rests against the bottom or base of the socket 30'. The bolt then extends through the first structure 12a and into the hole 24" of the second body 16" of the second joint 10". The hole 24" may be threaded and the first and second joints 10', 10" secured to the first structure via the threaded engagement of the bolt 22 and hole 24". A first body 14' is attached to a second structure 12b and a second first body 14" is attached to a third structure 12c, as previously described. The balls 28, 28" are then inserted into the respective sleeves 58, 58" and the sleeves inserted in the respective sockets 30', 30". A pin 44, 44" is then inserted into the first bodies 14, 14", as previously described, and the second and third structures set in their desired orientations wherein the pins 44, 44" are tightened to secure both joints 10', 10" in that orientation.

It may be desirable to control the amount the axis of rotation 54 may be adjustable with respect to the axis of the pin 44. In an embodiment seen in FIG. 10, the ball 28 has a tab 78 at its end. The cutout 68 in the bottom of the sleeve 58 and the tab 74 may be sized and shaped so that the tab engages an edge of the cutout when the second structure 12b or first body 14 has rotated a select amount to thereby prevent any further rotation. Other means for limiting rotation of a structure or the joint may also be used without departing from the spirit of the invention, for example the portion of the first body 14 between the shoulder 26 and the ball 28 and the space between the first and second tangs 60, 62, and/or first and second forks 32, 34 could be sized and shaped so that the portion engages one of the tangs or prongs when the second structure 12*b* or first body 14 has rotated a select amount to thereby prevent any further rotation.

The main components of the joint, for example, the first and second bodies 14, 16 and sleeve 58 could be manufactured through many methods known in the industry, including injection molding, casting or 3D printing, from a variety of materials including metals and plastics.

Figure 18:
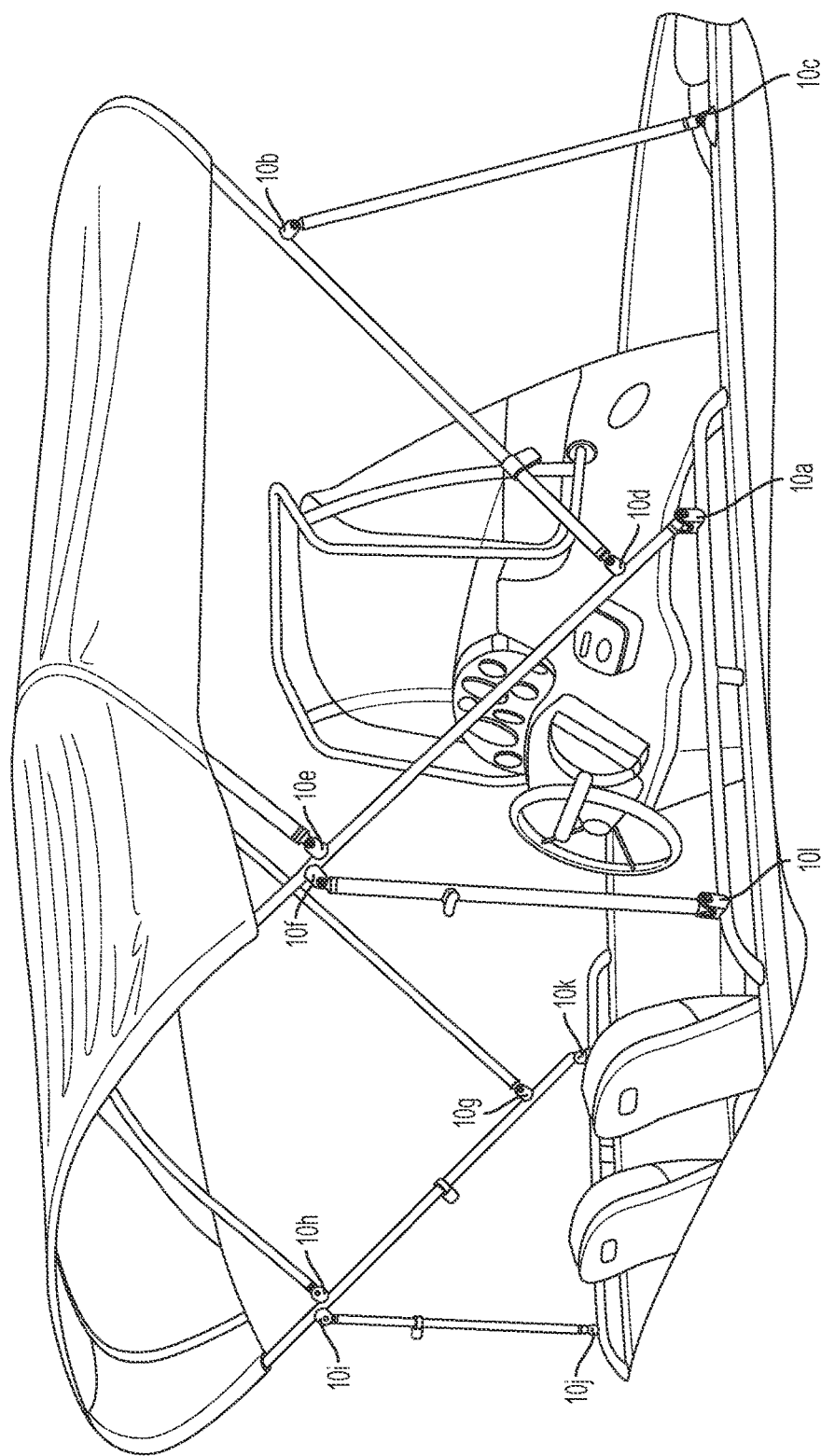
FIG. 18 is a perspective view of a frame with multiple joints in accordance with one embodiment of the present invention.

Applications for the joint of the present invention are numerous and wide-varied. For example, the joint could be used in a number of collapsible accessories such as tents, camera tripods, baseball pitching screens, display easels, or shade structures such as canopies. In the marine industry, the joint could be used on frame members for shades, such as bimini tops, or other enclosures. In a bimini top, such as seen in FIG. 18, one or more joints, for example 10*a*-1, could be used on an 'U' shaped frame between several structural members, or a locking strut to support a top frame. Although FIG. 18 shows a bimini top wherein all of the structural intersections are joints in accordance with the present invention, it possible that just a few select intersections would use such joints. These are just a few examples of the variety of uses of such a joint.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A joint for connecting a first structure and a second structure, the joint comprising:
   a ball portion having a ball with a bore formed therein;
   a forked portion having a first end configured to secure the forked portion to the first structure and a first fork parallel to a second fork that extend away from the first end to form a socket, each of the first and second fork having a hole formed therein;
   a pin sized to extend through the bore and each hole when the ball is within the socket to pivotally attach the ball portion and forked portion;
   wherein each of the first fork and the second fork have a first end adjacent the first end of the forked portion and a second end opposite the first end of the forked portion;
   wherein when the ball is inserted between the second end of the first fork and second fork, the second end of the first fork and second fork are configured to deform to permit the ball to be located within the socket;
   wherein when the ball is inserted between the second end of the first fork and second fork, a distance between the first fork and second fork at the first end remains the same.

2. The joint of claim 1 wherein the bore is larger than the pin such that an axis of rotation for the ball can be at an angle to a longitudinal axis through the pin.

3. The joint of claim 1 wherein one of the hole in the first fork and hole in the second fork is threaded to engage a plurality threads on the pin and wherein the pin may be selectively rotated between a locked position wherein the ball portion cannot move with respect to the forked portion and an unlocked position wherein the ball portion can move with respect to the forked portion.

4. The joint of claim 1 wherein one of the hole in the first fork and hole in the second fork is shaped and sized to receive a nut to engage a plurality threads on the pin and wherein the pin may be selectively rotated between a locked position wherein the ball portion cannot move with respect to the forked portion and an unlocked position wherein the ball portion can move with respect to the forked portion.

5. The joint of claim 1 further comprising a nut to engage a plurality threads on the pin and wherein the nut may be selectively rotated between a locked position wherein the ball portion cannot move with respect to the forked portion and an unlocked position wherein the ball portion can move with respect to the forked portion.

6. The joint of claim 1 wherein the forked portion has a mating end sized and shaped to engage the first structure.

7. The joint of claim 6 wherein the mating end has a threaded passage formed therein and the forked portion is attached to the first structure by a fastener that extends through the first structure and into threaded engagement with the threaded passage.

8. The joint of claim 6 further comprising a threaded insert and wherein the mating end has a passage formed therein sized and shaped to receive the threaded insert and the forked portion is attached to the first structure by a fastener that extends through the first structure and into threaded engagement with the threaded insert.

9. The joint of claim 1 wherein a portion of the socket engages the ball when the ball is within the socket and the portion is made from a material different than a material from which the forked portion is made.

10. The joint of claim 1 wherein at least one of the first and second fork has a spherical indentation.

11. The joint of claim 10 wherein at least one of the first and second fork has a recess.

12. The joint of claim 1 wherein the ball portion has a boss shaped and sized to attach the ball portion to the second structure.

13. The joint of claim 1 wherein at least one of the ball portion and the forked portion is comprised of a material selected from the group consisting of acetal homopolymer resin, nylon 6, polycaprolactam, nylon 12 and long glass fiber reinforced acetal.

14. The joint of claim 1 wherein the pin is movable between an engaged position such that the ball portion cannot rotate within the socket and a disengaged position such that the ball portion can rotate within the socket.

15. A joint for connecting a first bow of a collapsible bimini top to a second bow of the collapsible bimini top, the joint comprising:
    a forked body further comprising:
        a first prong with a first hole formed therein;
        a second prong with a second hole formed therein, the first and second prongs forming a socket; and
        an end of the forked body adapted to receive the first bow, wherein the end has a third hole adapted to receive a fastener to secure the forked body to the first bow;
    a ball body further comprising:
        a ball portion with a bore formed therein; and
        a boss adapted to be received by the second bow; and
    a pin received within the first hole, bore and second hole when the ball portion is within the socket;

wherein the bore is larger than the pin such that the ball portion configured to rotate about an axis different than an axis of the pin;

wherein the forked body is configured to be rotated with respect to the ball body when the forked body is secured to the first bow and the ball body is secured to the second bow and the ball body is pivotally attached to the forked body by the pin; and wherein the third hole is perpendicular to the bore.

16. The joint of claim 15 wherein a portion of the socket engages the ball portion when the ball portion is within the socket and the portion of the socket is made from a material different than a material from which the forked body is made.

17. The joint of claim 15 wherein the ball body has a boss shaped and sized to attach the ball body to the second bow.

18. The joint of claim 15 wherein the pin is movable between an engaged position such that the ball body cannot rotate within the socket and a disengaged position such that the ball body can rotate within the socket.

19. The joint of claim 15 further comprising a threaded insert and wherein the third hole is sized and shaped to receive the threaded insert and the forked body receives to the first bow by a fastener that extends through the first bow and into threaded engagement with the threaded insert.

* * * * *